United States Patent
Toshihiko et al.

(10) Patent No.: US 6,660,240 B1
(45) Date of Patent: Dec. 9, 2003

(54) GAS PROCESSING AGENT AND MANUFACTURING METHOD THEREFOR, GAS PURIFICATION METHOD, GAS PURIFIER AND GAS PURIFICATION APPARATUS

(75) Inventors: Sakurai Toshihiko, Tokyo (JP); Yusuke Nakaya, Ichikawa (JP); Masato Kawai, Tokyo (JP); Morimitsu Nakamura, Tokyo (JP); Nobuhiro Okamura, Tokyo (JP)

(73) Assignees: N.E. Chemcat Corporaiton, Tokyo (JP); Nippon Sanso Corporation, Tokyo (JP)

( * ) Notice: Subject to any disclaimer, the term of this patent is extended or adjusted under 35 U.S.C. 154(b) by 102 days.

(21) Appl. No.: 09/584,886

(22) Filed: Jun. 1, 2000

(30) Foreign Application Priority Data

Jun. 4, 1999 (JP) .......................... 11-158682

(51) Int. Cl.$^7$ ........................... C10K 1/34; B01D 53/04
(52) U.S. Cl. ................. 423/247; 422/190; 423/230; 423/248; 502/66; 502/74; 502/79; 502/400; 502/407; 502/414; 502/415
(58) Field of Search ............... 423/230, 247, 423/248; 502/400, 407, 414, 415, 66, 74, 79; 422/190

(56) References Cited

U.S. PATENT DOCUMENTS

| | | | | |
|---|---|---|---|---|
| 5,078,979 | A | | 1/1992 | Dunne .................... 423/212 |
| 5,110,569 | A | | 5/1992 | Jain ....................... 423/230 |
| 5,244,852 | A | * | 9/1993 | Lachman et al. ........ 502/66 |
| 5,677,258 | A | | 10/1997 | Kurokawa et al. ...... 502/303 |
| 5,906,675 | A | | 5/1999 | Jain et al. |
| 6,093,379 | A | * | 7/2000 | Golden et al. .......... 423/230 |

* cited by examiner

Primary Examiner—Stanley S. Silverman
Assistant Examiner—Maribel Medina
(74) Attorney, Agent, or Firm—Merchant & Gould P.C.

(57) ABSTRACT

The present invention relates to a gas processing agent for removing carbon monoxide, hydrogen, carbon dioxide and water vapor in a gas at the same time, which can maintain a high oxidation activity and have a long life time, a manufacturing method therefor and a gas purification method. More specifically, the present invention relates to a gas processing agent made of a catalyst made of an inorganic porous material layer containing at least one selected from a group consisting of platinum, palladium, rhodium and ruthenium, or oxides thereof and an adsorbent, and a manufacturing method therefor, a gas purifier, a gas purification method and a gas purification apparatus using the gas processing agent.

16 Claims, 3 Drawing Sheets

GAS PROCESSING AGENT AND MANUFACTURING METHOD THEREFOR, GAS PURIFICATION METHOD, GAS PURIFIER AND GAS PURIFICATION APPARATUS

FIELD OF THE INVENTION

The present invention relates to a gas-processing agent for gas purification, which oxidizes carbon monoxide and/or hydrogen contained in a compressed gas in the presence of oxygen, and then removes the simultaneously produced carbon dioxide and/or water vapor by means of adsorption. In particular, the present invention relates to a gas processing agent for gas purification used in a gas purifier which oxidizes and removes carbon monoxide and/or hydrogen from the compressed air, in a feed gas purification system of a cryogenic air separation plants which separates and produces highly-purified nitrogen, oxygen and the like by compressing air, removing a small amount of impurities contained therein, cooling and performing rectification by liquefaction. In addition, the present invention relates to a manufacturing method of a processing agent for gas purification and a gas purification method, a gas purifier and a gas purification apparatus using the gas processing agent.

DESCRIPTION OF THE PRIOR ART

Conventionally, alumina catalyst impregnated with platinum or alumina catalyst impregnated with palladium and the like have been used as a gas processing agent for purifying a feed air in a cryogenic air separation plants for producing highly-purified nitrogen etc. It is essential to use these catalysts at a temperature within a range of 100~250° C. for oxidizing and removing carbon monoxide and/or hydrogen which are generally contained in the atmosphere at a content of 1 to several ppm, and, in order for capturing carbon dioxide and water vapor generated by oxidation reaction, to cool a gas after the reaction and then remove them using an adsorbent. For this reason, a great quantity of air and catalyst have to be heated and cooling equipments and adsorbents have to be used for capturing carbon dioxide and water vapor, which are very uneconomical.

As an example of a gas purification using a catalyst around the room temperature, Japanese patent laid-open publication No. 4-219111 discloses a method for manufacturing a highly-purified gas by using a catalyst at a reaction temperature within a range of 4.4~50° C. In this method, at first water vapor is removed from air flow containing carbon monoxide, hydrogen, carbon dioxide and water vapor by an adsorbent, then carbon monoxide is oxidized to carbon dioxide by a mixture of manganese oxide and copper oxide, then hydrogen is oxidized to water vapor by using palladium catalyst, and then carbon dioxide and water vapor are adsorbed and removed by providing an adsorbent in the rearmost end portion of the catalyst. However, each separate catalyst layer is required for the oxidation reaction of carbon monoxide and for the oxidation reaction of hydrogen, and in addition, another adsorbent layer is need to be provided in the rear end portion of catalyst layer for removing carbon dioxide and water vapor, which are generated in oxidation reaction, from a processing gas.

Similarly, Japanese patent laid-open publication No.10-85588 reports an example of a gas purification performed by using a catalyst at a temperature within a range of 0~100°C. This method is to remove carbon monoxide, hydrogen, carbon dioxide and water vapor contained in gas, by solely or jointly using each catalyst in which gold impregnated metal oxides or alkaline earth metal hydroxides or palladium is impregnated in adsorbents with a good adsorption ability of carbon dioxide and water vapor in the presence of oxygen. However, as the catalytic components are impregnated in the adsorbent itself with a good adsorption ability of carbon dioxide and water vapor, the carbon monoxide and water vapor generated by the oxidation of carbon monoxide and hydrogen, adsorbed and accumulated in the catalytic active site, hinder the carbon monoxide and hydrogen in the gas flow from being adsorbed to the catalytic active site and further obstruct the catalytic reaction. Therefore, there is a problem that a duration of an oxidation ability of carbon monoxide and hydrogen in the gas flow do not continue for a long time.

Under the above circumstances, a gas purification processing agent having a dual function, which oxidizes carbon monoxide and/or hydrogen at the temperature within the range of 0~100° C. and adsorbs and removes the generated carbon dioxide and/or water vapor at the same time, catalytic oxidation ability and oxidation ability of which continues for a long time, has been demanded.

SUMMARY OF THE INVENTION

The present invention has been developed to solve the above-mentioned problems and has an object of providing a gas processing agent which can remove carbon monoxide, hydrogen, carbon dioxide and water vapor contained in gas at the same time, keep a high adsorption ability and catalytic oxidation activity and have a long life time, a manufacturing method therefore, a gas purification method, a gas purifier and a gas purification apparatus.

The present inventors have conducted significant studies to solve the above-mentioned problem and as a result, have found out a gas processing agent with a long life time, which can oxidize carbon monoxide(CO) and/or hydrogen($H_2$) at a temperature within a range of 0~80°C. in the presence of oxygen and simultaneously remove the generated carbon dioxide($CO_2$) and water vapor($H_2O$), thereby completing the present invention.

That is, the present invention provides a gas processing agent comprising a catalyst made of inorganic porous materials containing at least an element selected from a group consisting of platinum, palladium, ruthenium, rhodium or the oxides thereof, and an adsorbent.

Further, the present invention provides a manufacturing method of the gas processing agent, a gas purification method using the gas processing agent, a gas purifier and a gas purification apparatus.

DETAILED DESCRIPTION OF PREFERRED EMBODIMENTS

Figure 1:
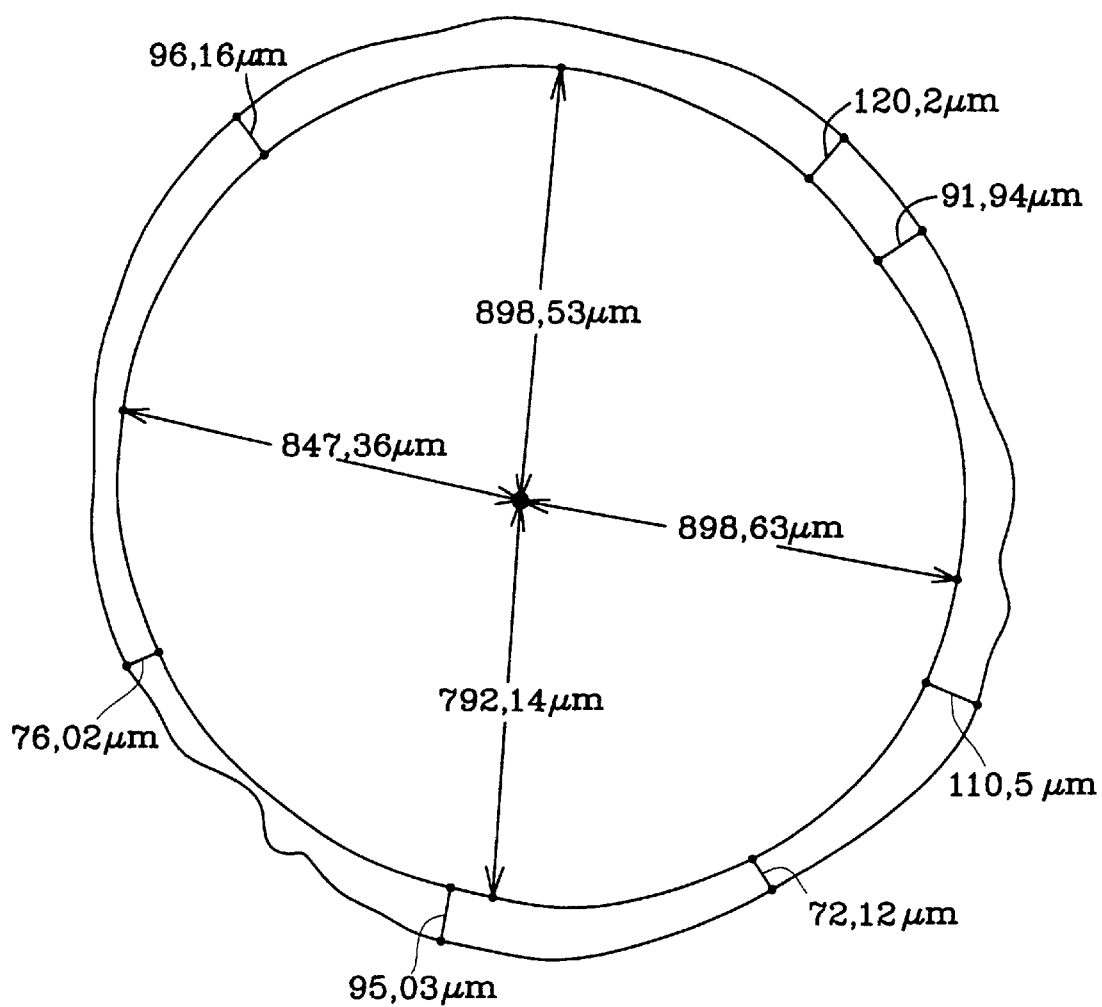
FIG. 1 shows schematic view of the cross section of a gas processing agent according to the present invention analyzed with an electron probe micro analyzer.

A gas processing agent of the present invention is obtained by forming an inorganic porous material layer containing at least an element selected from a group consisting of Pt, Pd, Ru and Rh or the oxides thereof, on the surface of an adsorbent.

In the gas processing agent of the present invention, an element selected from the group consisting of Pt, Pd, Ru and Rh or the oxide thereof, which is impregnated in inorganic porous materials, is used as a catalyst for oxidizing CO and/or $H_2$ in a gas.

The impregnated element can be one or more than two kinds of Pt, Pd, Ru and Rh. Further, the element impregnated may be either in a metallic state or in an oxide state. However, the metallic state is more preferable.

As the inorganic porous materials, alumina, titania, silica, silica-alumina, zirconia, tin-oxide, lanthanum-oxide, ceria, activated carbon, graphite-carbon are preferably used. Among the above, alumina, titania, silica, silica-alumina, zirconia, tin-oxide are preferably used in particular. The above materials can be used alone or can be used as the mixture of more than one kind thereof.

The specific surface area of the inorganic porous materials is preferably 10 $m^2/g$ or more, more preferably 30 $m^2/g$ or more. If the specific surface area is less than 10 $m^2/g$, the dispersion condition of the component impregnated in the inorganic porous materials becomes worse, and thus the activity has a tendency to be lowered.

Further, the element content is preferably 0.25~10 wt % (as metal), more preferably 0.5~5 wt % to the total weight of the gas processing agent (weight of the catalyst+weight of the adsorbent, which is described later). If the element content is less than 0.25 wt %, oxidation activity of hydrogen tends to be lowered and if the element content is more than 10 wt %, the activity does not increase in proportion to the increased element content, which leads to economical disadvantage.

The catalyst as described above is formed as layer-shape on the adsorbent. The thickness of a catalyst layer is preferably 10~500 $\mu$m, more preferably 30~200$\mu$m. If it is below 10 $\mu$m, the generated $CO_2$ or $H_2O$ tends to hinder CO and/or $H_2$ in being adsorbed to the catalytic active site. In addition, if it is over 500 $\mu$m, the catalyst layer tends to be peeled off. The CO and/or $H_2$ in gas is oxidized to $CO_2$ or $H_2O$ by the catalyst.

The gas processing agent of the present invention uses an adsorbent for adsorbing the generated $CO_2$ and/or $H_2O$. The selection of the adsorbent is not limited in particular, only if it is suitable for the purpose of the present invention. The adsorbent may be, for example, zeolite, activated alumina or activated carbon. Among these, zeolite is preferably used. The specific surface area of the zeolite is preferably over 100 $m^2/g$. If it is below 100 $m^2/g$, the adsorptivity tends to be lowered. Among the zeolites, Li-X type, Na-X type, Ca-X type, Ba-X type, Na-A type, K-A type and Ca-A type are preferred in particular. The shape of the adsorbent is not limited, and can be properly selected from spherical shape, extrude, or the like, depending on the conditions of use. Further, the size of the adsorbent may be also properly selected depending on the conditions of use.

As above,the gas processing agent of the present invention has the structure that the catalyst layer is formed on the adsorbent, and thus the $CO_2$ and/or $H_2O$ oxidized in the catalyst layer is removed from the catalyst layer immediately to the adsorbent without staying catalyst layer. For this reason, the catalyst layer can keep a high oxidation activity over CO and/or $H_2$.

Therefore, the gas processing agent of the present invention can remove CO, H2, $CO_2$ and $H_2O$ from the gas at the same time, and has a long life time both to the oxidation of CO and $H_2$ and the adsorption of $CO_2$ and $H_2O$.

The above gas processing agent can be produced in the following method.

The preferred manufacturing method comprises;
(a) a process of preparing a precursor or a slurry of the catalyst,
(b) a process of coating the slurry onto the adsorbent and then calcining that The slurry of the catalyst precursor can be prepared by, for example, a method comprising mixing water, inorganic porous material powder, a compound including an element selected from a group consisting of Pt, Pd, Rh and Ru which will be impregnated, and a binder or the like, and then crushing them.

As for the starting compound for the component which will be impregnated, chloride such as palladium chloride, rhodium chloride or the like, nitrate such as palladium nitrate, ruthenium nitrate or the like, sulfates such as rhodium sulfate, ruthenium sulfate or the like, and acetates such as palladium acetate, rhodium acetate or the like, can be used. In addition, the organic salt, amine, alkali salt, organic complex or the like can be used.

As for the binder, for example, aluminium sulfate, aluminium nitrate, water glass, silica sol, alumina sol, zirconia sol or the like can be used. As for the additive agent, for example, an organic acid of acetic acid or the like, or an inorganic acid of nitric acid or the like can be used. Further, if necessary, a defoaming agent can be added.

Then, as for a method for coating the slurry onto the adsorbent, there is no specific limitation, and conventional methods such as dipping or spray can be used.

The calcining can be carried out either in air or in an inert gas, and the calcining temperature is preferably 200~600° C. and more preferably 400~500° C. The calcining time is preferably 0.5~5 hours and more preferably 1~3 hours.

In addition, the above process (b) can be followed by a gas phase reduction process which makes it possible to produce the gas processing agent with a higher activity. As a reducing agent For the gas phase reduction process, hydrogen or mixing gases of hydrogen and inert gases such as nitrogen or the like can be used. The reduction temperature is preferably 150~500° C. and more preferably 200~400° C., and the reduction time is preferably 0.5~5 hours and more preferably 2~3 hours.

Another preferable manufacturing method of the gas processing agent comprises,
(a) a process of preparing a slurry of the above-mentioned inorganic porous materials,
(b) a process of coating the slurry(a) onto the adsorbent and then calcining that.
(c) a process of preparing a slurry of at least one compound selected from a group consisting of platinum, palladium, rhodium and ruthenium.
(d) a process of coating the slurry(c) onto the adsorbent and then calcining that.

In addition, a gas phase reduction can be carried out after the process (d).

FIG. 1 shows a schematic view obtained by analysis of a cross section of the gas processing agent prepared by the above-mentioned process with an electron probe micro analyzer(EPMA). It shows that the catalyst layer is formed on the adsorbent.

Then, a gas purification method to achieve the above-mentioned purpose will be explained as follows.

One embodiment according to the present invention discloses the gas purification method for purifying a feed gas containing at least carbon monoxide and/or hydrogen as a very small amount of impurities and removing the very small amount of the impurities, wherein the feed gas is purified by using a gas processing agent having the oxidizing catalyst performance and adsorption ability, at a used temperature of 0~80° C.

The above-mentioned gas processing agent can be appropriately used around room temperature, as apparent in the following evaluation test result. It is very advantageous with respect to working cost that a gas purifier and a gas purification apparatus can be operated around room temperature. In addition, the oxidation reactions of carbon monoxide and hydrogen tend to be proceeded more easily in high temperature and the adsorptive and removing ability of carbon dioxide and water generated by the oxidation reaction is accelerated in lower temperature. The present gas processing agent, thus, can carry out the aimed gas processing operation more appropriately, at the temperature of 100° C. or less, more preferably 80° C. or less.

Figure 2:
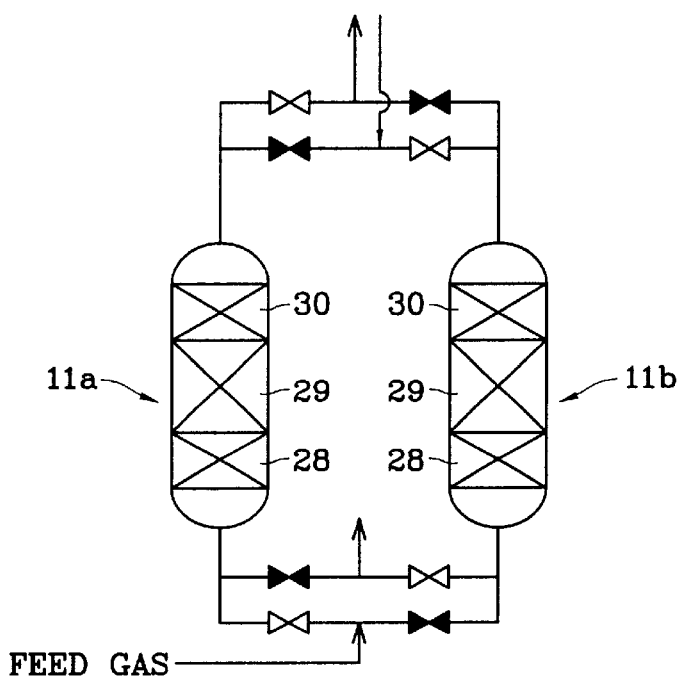
FIG. 2 shows an embodiment of a gas purifier according to the present invention.

FIG. 2 shows an embodiment of a gas purifier and a gas purification apparatus of the present invention applied to the pre-treatment for a cryogenic air separation plants. FIG. 2 shows the gas purifier 11a, 11b comprising a first adsorbent layer 28, a second adsorbent layer 29 and a gas processing agent layer 30 which are formed in an order according to the direction of the air flow in a packing vessel having a feed gas inlet opening and a feed gas outlet opening. The first adsorbent layer 28 comprises an adsorbent (for example, activated alumina) adsorbing and removing water vapor in a compressed air, the second adsorbent layer 29 comprises an adsorbent (for example, Na-X type zeolite) adsorbing and removing carbon dioxide in the compressed air, and the gas processing agent layer 30 comprises a gas processing agent in which a catalyst layer containing a element for oxidizing carbon monoxide and hydrogen in the presence of oxygen is coated onto an adsorbent.

A feed air compressed by an air compressor is cooled to a suitable temperature by air-cooling or water-cooling and introduced to the first adsorbent layer 28 after the condensed water is separated. The adsorbent of the first adsorbent layer 28 is a drying agent and most of the water vapor contained in the compressed air is adsorbed and removed, become highly dried gas condition and introduced to the second adsorbent layer 29. Hereupon, the dried gas condition whose dew point is −70° C. or lower, is preferred.

In the second adsorbent layer 29, carbon dioxide contained in the compressed air is adsorbed and removed to the very small amount (of approximately below 1 ppm). Further, the adsorbent of the water vapor and/or carbon dioxide has an ability of adsorbing the catalyst poisoning component contained in the feed gas. Therefore, during the compressed air passes through the first and second adsorbent layer 28,29, the components which are included in air and harmful to the catalyst activity even in very small amount of volatile hydrocarbons, halogen-contained hydrocarbons, organic sulfur compound, sulfur oxide, nitrogen oxide or the like, are adsorbed and removed, which makes the condition clean for the catalyst.

The compressed air, the condition of which became clean for the catalyst, is introduced to the gas processing agent layer 30 for converting and removing carbon monoxide and hydrogen, and the very small amount of carbon monoxide and hydrogen contained in the compressed air react with oxygen in the compressed air by the catalysts of the catalyst layer containing the element for oxidizing carbon monoxide and hydrogen coated on the adsorbent, and are converted into carbon dioxide and water vapor. The carbon dioxide and water vapor are adsorbed into the adsorbent as catalyst carrier immediately and removed from the feed air.

Figure 3:
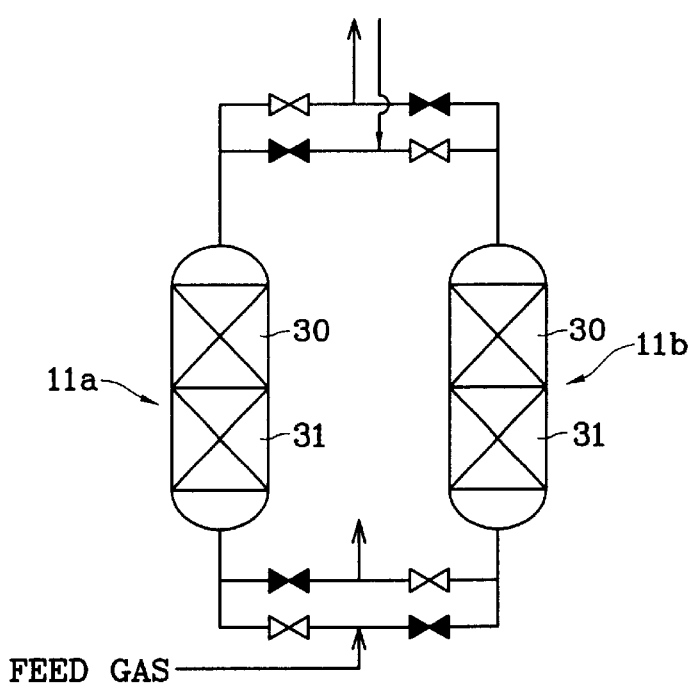
FIG. 3 shows another embodiment of a gas purifier according to the present invention.

In the following, another embodiment of the present invention will be explained using FIG. 3. FIG. 3 shows an embodiment that the purifier 11a, 11b is a two layer charging type purifier in which only one adsorbent layer 31 is formed in a front part of the gas processing agent layer 30. In this embodiment, by using an adsorbent which simultaneously adsorbs both water vapor and carbon dioxide (an adsorbent having the ability of the adsorbent layer 28+29, for example, Na-X type zeolite) in the front adsorbent layer 31, the water and carbon dioxide in the feed air are removed in advance and the very small amount of carbon monoxide and hydrogen are removed from the gas processing agent layer 30. In addition, the adsorbent (for example, activated alumina) for adsorbing and removing water vapor can be used in the front adsorbent layer 31.

To achieve the above-mentioned purpose, the gas purifier can be provided with the adsorbent and the gas processing agent in the packing vessel having a feed gas inlet opening and a feed gas outlet opening, in order from the inlet opening of a water adsorbent packing layer, a carbon dioxide adsorbent packing layer and a gas processing agent packing layer having the oxidation catalyst ability and adsorptivity, or a water vapor and carbon dioxide adsorbent packing layer and the gas processing agent packing layer, or a water vapor adsorbent packing layer and the gas processing agent packing layer. In particular, the adsorbent of the gas purifier has an ability of absorbing the catalyst poisoning component contained in the feed gas.

The gas purification apparatus of the present invention to achieve the above purpose is provided with a plurality of the gas purifier, a switching means to switch the gas purifier between a purifying step and a regenerating step by turns, and a regeneration gas supply means for supplying a regeneration gas for the gas purifier in the direction of counterflow, wherein the gas purifier is alternately used by switching in turns and regenerated repeatedly.

In the present gas purification method in which a feed gas containing a small amount of water vapor and carbon dioxide as impurities and at least carbon monoxide and/or hydrogen as a very small amount of impurities is purified so as to remove the small amount of impurities and the very small amount of impurities, at first the water vapor contained is adsorbed and removed by the water vapor adsorbent, then the carbon dioxide contained are adsorbed and removed by the carbon dioxide adsorbent and then the very small amount of carbon monoxide and/or hydrogen contained are removed by the gas processing agent.

In addition, in the present method in which a feed gas containing a small amount of water vapor and/or carbon dioxide as impurities and at least carbon monoxide and/or hydrogen as a very small amount of impurities is purified so as to remove the small amount of impurities and the very small amount of impurities, at first the water vapor and/or carbon dioxide contained are adsorbed and removed by the water vapor and carbon dioxide adsorbent and then the very small amount of carbon monoxide and/or hydrogen are removed by the gas processing agent with the catalytic oxidation ability and adsorption ability, or at first the water vapor are adsorbed and removed by the water vapor adsorbent and then the very small amount of carbon monoxide and/or hydrogen are removed by the gas processing agent with catalytic oxidation ability and adsorption ability.

By using the above-mentioned gas processing agent, the dual function that not only carbon monoxide and/or hydrogen can be oxidized to the low concentration effectively at the temperature within the range of 0~80° C. in the presence of oxygen, but also the simultaneously generated water vapor and/or carbon dioxide can be adsorbed and removed to the low concentration effectively, can be coped with by only one processing agent. Therefore, the processing agent can be provided at the lowermost position about the direction of the gas flow in the gas purifier, and the adsorbent layer provided in the rear end portion of the processing agent in the conventional purification apparatus to remove carbon dioxide and water vapor generated by oxidation, is not required, and thus the whole apparatus can be made small.

Further, even in the case that the catalyst poisoning component such as chlorine, sulfur compound, etc. are included in the gas before purification, the effect of the poisoning component to the catalyst element in the present gas processing agent can be minimized by arranging the present gas processing agent at the lowermost position of the purifier.

In addition, even in the case that the oxidation ability or adsorption ability of the present gas processing agent are decreased by the adsorption of carbon dioxide and/or water vapor and thus the processing is carried out by the counter-flow regeneration gas, by providing the gas processing agent in the rearmost end portion, the gas processing agent is regenerated by the cleanest regeneration gas, resulting in that the effective regeneration can be carried out and maintenance become preferable.

The present gas processing agent has an oxidation ability of carbon monoxide and/or hydrogen at the temperature within a range of 0~80° C., and the simultaneously generated carbon dioxide and water vapor can be adsorbed and removed to low concentration for a long time. Therefore, the purified gas can be easily obtained by packing the water vapor and/or carbon dioxide adsorbent packing layer at the inlet opening side and the present gas processing agent in order about the gas flow direction in the purifier, in purifying gases such as the atmosphere containing carbon monoxide, hydrogen, carbon dioxide, water vapor gas, etc.

The present gas processing agent can oxidize carbon monoxide and/or hydrogen at the same time at the temperature within the range of 0~80° C., and the simultaneously generated carbon dioxide and water vapor can be adsorbed to the low concentration for a long time. Therefore, the packing layer of the present gas processing agent, which is a catalyst layer, can be provided in the lowermost position about the gas flow direction in the gas purifier, and there is no need to provide an adsorbing equipment for removing carbon dioxide and water vapor generated by oxidation at the rear end portion of the gas processing agent layer in the purification apparatus, which result in that the whole equipment can be made small and simple.

In the air before purification, as catalyst poisoning components which are accumulated on the surface of the catalyst due to the long-term use of the catalyst and exhausted from industrial waste gases, car exhaust gases or the like, chlorine compounds such as chlorine, hydrogen chloride, trichlene, etc., sulfur compounds such as hydrogen sulfide, mercaptan, etc., VOC(volatile organic compounds), carbon black etc. are contained, though in very small amount. Even in such a case that the condition of the feed gas is bad, the present gas processing agent can be provided in the rearmost position in the purifier, and thus the effect of the poisoning component to the catalyst in the present processing agent can be minimized.

In regenerating step by counter-flow clean gas in the case that the oxidation catalyst ability or adsorption ability of the present processing agent are lowered due to the adsorbing of carbon dioxide and/or water vapor, the gas processing agent is provided in the rearmost position, and thus the effect of the impurities desorbed from the front end layer can be avoided and the effective regeneration can be obtained.

The present invention will be fully described by referencing the following embodiments of the manufacturing method of the present gas processing agent. However, it is to be understood that the present invention is not limited to the embodiments.

Embodiment 1

(1) 330 g of commercially available 5 wt % Pd-alumina powder was mixed with 740 g de-ionized water and 30 ml of acetic acid. The mixture thereof was milled for 15 hours in a ball mill and catalyst slurry was obtained.

(2) 900 g of the adsorbent(Na-X type, diameter 1.5 mm, length 3 mm) was put into the pillcoating machine and electrically driven. 550 g of the catalyst slurry obtained from (1) was coated onto the adsorbent using a spray. After taken out, it was dried for 1 hour at 100° C. with drier, moved into a quartz tray and calcined for 1 hour at 500° C. in air in an electric furnace, and thus a gas processing agent A-1 was obtained.

Embodiment 2

The gas processing agent A-1 obtained from the embodiment 1 was reduced for 2 hours at 200° C., with the 10 vol % $H_2$ gas(base gas is $N_2$), in the furnace, and thus a gas processing agent A-2 was obtained.

Embodiment 3

The gas processing agent A-1 obtained from the embodiment 1 was reduced for 2 hours at 400° C., with the 10 vol % $H_2$ gas(base gas is $N_2$), in the furnace, and thus a gas processing agent A-3 was obtained.

Embodiment 4

(1) 462.5 g of commercially available alumina powder (specific surface area of 100 $m^2/g$) was mixed with 715.5 g of the de-ionized water containing palladium nitrate (Pd$(NO_3)_2$) (12.5 g as Palladium metal) and 250 g of alumina sol(alumina 10 wt %). The mixture thereof was milled for 15 hours in the ball mill and the catalyst precursor slurry was obtained.

(2) 742 g of the adsorbent as used in the Embodiment 1(2) was put into the pill-coating machine and electrically driven, and 472 g of the catalyst slurry obtained from (1) was coated on the adsorbent using the spray. After taken out, it was dried for 1 hour at 100° C. with drier. Then, after being put into the pill-coating machine and electrically driven, the above-mentioned coating and drying were repeated. Then, it was moved into the quartz tray, calcined for 1 hour at 500° C. in air in the electric furnace, and subjected to the reduction process for 2 hours at 200° C., in the 10 vol % $H_2$ gas(base gas is $N_2$) in the furnace, and thus a gas processing agent A-4 was obtained.

Embodiment 5

(1) 165 g of commercially available 10 wt % Pd-alumina powder was mixed with 645 g of the de-ionized water, 15 ml of acetic acid and the mixture thereof was milled for 15 hours in the ball mill, and thus the catalyst precursor slurry was obtained.

(2) 989 g of the adsorbent as used in the Embodiment 1(2) was put into the pill-coating machine and electrically driven, and 413 g of the slurry obtained from (1) was coated on the adsorbent using the spray. After taken out, it was dried at 100° C. for 1 hour using the heated-air drier. Then, it was moved into the quartz tray and calcined for 1 hour at 500° C. in air in the electric furnace.

(3) Then, it was subjected to the reduction process for 2 hours at 200° C., in the 10 vol % $H_2$gas(base gas is $N_2$) in the furnace, and thus a gas processing agent A-5 was obtained.

Embodiment 6

(1) 330 g of commercially available 5 wt % Pt-alumina powder was mixed with 740 g of the de-ionized water, 30 ml of acetic acid, and the mixture thereof was milled for 15 hours in the ball mill and the catalyst precursor slurry was obtained.

(2) 900 g of the adsorbent as used in the Embodiment 1(2) was put into the pill-coating machine and electrically driven, and 550 g of the catalyst slurry obtained from (1) was coated on the adsorbent using the spray. After taken out, it was dried at 100° C. for 2 hours with drier. Then, it was moved into the quartz tray and calcined for 1 hour at 500° C. in air in the electric furnace.

(3) Then, it was subjected to the reduction process for 2 hours at 200° C., in the 10 vol % $H_2$ gas(base gas is $N_2$) in the furnace, and thus a gas processing agent A-6 was obtained.

Embodiment 7

(1) 442 g of commercially available alumina (specific surface area of 100m²/g) was mixed with 487.5 g of palladium nitrate($Pd(NO_3)_2$) aqueous solution containing 25 g as palladium metal, 487.5 g of tetraamine platinum (II) diacetate ($[Pt(NH_3)_4](OAc)_2$) aqueous solution containing 8.35 g as platinum metal, and 250 g of alumina sol(alumina 10 wt %), and the mixture thereof was milled for 15 hours in the ball mill and the catalyst precursor slurry was obtained.

(2) 900 g of the adsorbent as used in the Embodiment 1(2) was put into the pill-coating machine and electrically driven, and 550 g of the slurry obtained from (1) was coated onto the adsorbent using the spray. After taken out, it was dried at 100° C. for 1 hour with drier. Then, it was moved into the quartz tray and calcined for 1 hour at 500° C. in air in the electric furnace.

(3) Then, it was subjected to the reduction process for 2 hours at 200° C., in the 10 vol % H2 gas(base gas is $N_2$) with furnace, and thus a gas processing agent A-7 was obtained.

Embodiment 8

(1) 442 g of commercially available alumina powder (specific surface area of 100 m²/g) was mixed with 487.5 g of palladium nitrate($Pd(NO_3)_2$) aqueous solution containing 25 g as palladium metal, 487.5 g of rhodium nitrate ($[Rh(NO_3)_3]$) aqueous solution containing 8.35 g as rhodium metal, and 250 g of alumina sol(alumina 10 wt %) and the mixture thereof was milled for 15 hours in the ball mill and the catalyst precursor slurry was obtained.

(2) The process equal to the Embodiment 7(2) was performed.

(3) By subjecting the same treatment as the Embodiment 7(3), excluding that the temperature was 400° C., a gas processing agent A-8 was obtained.

Embodiment 9

(1) 442 g of commercially available alumina powder (specific surface area of 100 m²/g) was mixed with 487.5 g of palladium nitrate($Pd(NO_3)_2$) aqueous solution containing 25 g as palladium metal, 487.5 g of ruthenium nitrosyl nitrate($[Ru(NO)(NO_3)_3]$) aqueous solution containing 8.35 g as ruthenium metal, and 250 g of alumina sol(alumina 10 wt %), and the mixture thereof was milled for 15 hours in the ball mill and the catalyst precursor slurry was obtained.

(2) The process equal to the Embodiment 7(2) was performed.

(3) By subjecting the same process as the Embodiment 8(3), a gas processing agent A-9 was obtained.

Embodiment 10

(1) 450 g of commercially available silica powder (specific surface area of 100 m²/g) was mixed with 1067 g of palladium nitrate($Pd(NO_3)_2$) aqueous solution containing 25 g as palladium metal, and 125 g of silica sol(silica 20 wt %), and the mixture thereof was milled for 15 hours in the ball mill and the catalyst precursor slurry was obtained.

(2) The process equal to the Embodiment 7(2) was performed (3) By subjecting the same process as the Embodiment 8(3), a gas processing agent A-10 was obtained.

Embodiment 11

(1) 80 g of commercially available alumina powder (specific surface area of 100 m²/g) was mixed with palladium black(100 g as palladium metal), 191 g of de-ionized water and 200 g of alumina sol(alumina 10 wt %), and the mixture thereof was milled for 15 hours in the ball mill and the catalyst precursor slurry was obtained.

(2) 400 g of the adsorbent as used in the Embodiment 1(2) was put into the pill-coating machine and electrically driven, and 286 g of the catalyst slurry obtained from (1) was coated onto the adsorbent using the spray. After taken out, it was dried at 100° C. for 1 hour with drier.

(3) By subjecting the same process as the Embodiment 8(3), a gas processing agent A-11 was obtained.

Embodiment 12

(1) A mixture of 180 g of commercially available alumina powder (specific surface area of 100 m²/g), 287 g of de-ionized water and 200 g of alumina sol(alumina 10 wt %) was milled for 15 hours in the ball mill, and the alumina slurry was obtained.

(2) 900 g of the adsorbent as used in the Embodiment 1(2) was put into the pill-coating machine and electrically driven, and 522 g of the alumina slurry obtained from (1) was coated onto the adsorbent using the spray. After taken out, it was dried at 100° C. for 1 hour with drier and moved into the quartz tray and calcined for 1 hour at 500° C. in air in the electric furnace. Then, the calcined adsorbent was put into the pill-coating machine again and electrically driven and coated with 300 g of palladium nitrate($Pd(NO_3)_2$) aqueous solution containing 8.25 g as palladium metal using the spray.

Then, the drying and calcination of (2) were repeated.

(3) By subjecting the same process as the Embodiment 8(3), a gas processing agent A-12 was obtained.

Embodiment 13

(1) 330 g of commercially available 5 wt % Pt-alumina powder was mixed with 580 g of the de-ionized water, 30 ml of acetic acid and the mixture thereof was milled for 15 hours in the ball mill, and thus the catalyst precursor slurry was obtained.

(2) 330 g of commercially available 5 wt % Pd-alumina powder was mixed with 580 g of the de-ionized water, 30 ml of acetic acid and the mixture thereof was milled for 15 hours in the ball mill, and thus the catalyst precursor slurry was obtained.

(3) 635 g of the adsorbent (Na-X type, diameter 1.5 mm, length 3 mm) was put into the pill-coating machine and electrically driven. 117 g of the catalyst precursor slurry obtained from (1) was coated onto the adsorbent using a spray.

(4) And next, 354 g of the catalyst precursor slurry obtained from (2) was coated onto the adsorbent using a spray.

(5) After taken out, it was dried for 1 hour at 100° C. with drier, moved into a quartz tray and calcined for 1 hour at 500° C. in air in an electric furnace.

(6) By subjecting the same process as the Embodiment 8(3), a gas processing agent A-13 was obtained.

COMPARATIVE EXAMPLE 1

It was prepared according to the Embodiment 1-① of the Japanese patent laid-open publication No.10-85588.

(1) Palladium nitrate ($Pd(NO_3)_2$) solution containing 5.3 g of palladium metal was diluted with de-ionized water up to 310 g.

(2) 500 g of the adsorbent as used in the Embodiment 1(2) was put into the pill-coating machine and electrically driven, and 310 g of the above mentioned palladium nitrate solution (1) was coated onto zeolite using the spray. After taken out, it was dried at 100° C. for 1 hour with drier and moved into the quartz tray and calcined for 1 hour at 500° C. in air in the electric furnace, and thus a gas processing agent B-1 was obtained.

COMPARATIVE EXAMPLE 2

The gas processing agent B-1 obtained from the comparative example 1 was processed in the same as the Embodiment 2 using the hydrogen reduction furnace, and thus a gas processing agent B-2 was obtained.

COMPARATIVE EXAMPLE 3

(1) 330 g of commercially available 2 wt % Pd-alumina powder, 740 g of de-ionized water and 30 ml of acetic acid were mixed and the mixture thereof was milled for 15 hours in the ball mill and the catalyst precursor slurry was obtained.

(2) 1115 g of the adsorbent as used in the Embodiment 1(2) was put into the pill-coating machine and electrically driven, and 550 g of the slurry obtained from (1) was coated onto the adsorbent using the spray. After taken out, it was dried at 100° C. for 1 hour with drier. Then, it was moved into the quartz tray and calcined for 1 hour at 500° C. in air in the electric furnace.

(3) By subjecting the same process as in the Embodiment 2, a gas processing agent B-3 was obtained.

COMPARATIVE EXAMPLE 4

Commercially available 0.50% Pd-alumina sphere (catalyst diameter 3 mm) was determined to be a gas processing agent B-4.

The specification of the gas processing agents obtained from the above result is shown in Table 1.

| No | Gas processing agent | Specification |
|---|---|---|
| Embodiment 1 processing agent A-1 | 0.75 wt % Pd alumina coat/zeolite The product not processed with hydrogen reduction | 5.0 wt % Pd-alumina slurry is coated on zeolite(extrude shape of diameter 1.5 mm) |
| Embodiment 2 processing agent A-2 | 0.75 wt % Pd alumina coat/zeolite The product processed with hydrogen reduction | The product processed with hydrogen reduction in 200° C. of Embodiment 1 |
| Embodiment 3 processing agent A-3 | 0.75 wt % Pd alumina coat/zeolite The product processed with hydrogen reduction | The product processed with hydrogen reduction in 400° C. of Embodiment 1 |
| Embodiment 4 processing agent A-4 | 0.75 wt % Pd alumina coat/zeolite The product processed with hydrogen reduction | 2.5 wt % Pd-alumina is coated on zeolite(extrude shape of diameter 1.5 mm) and the thickness of the catalyst coating layer approximately doubles that of the Embodiment 2 |
| Embodiment 5 processing agent A-5 | 0.75 wt % Pd alumina coat/zeolite The product processed with hydrogen reduction | 10 wt % Pd alumina is coated on zeolite(extrude shape of diameter 1.5 mm) and the thickness of the catalyst coating layer approximately half that of the Embodiment 2 |
| Embodiment 6 processing agent A-6 | 0.75 wt % Pt alumina coat/zeolite The product processed with hydrogen reduction | The impregnated element of Embodiment 2 is changed from palladium to platinum. |
| Embodiment 7 processing agent A-7 | 0.75 wt % Pd - 0.25 wt % Pt alumina coat/zeolite The product processed with hydrogen reduction | 5.0 wt % Pd - 1.67% Pt alumina is coated. |
| Embodiment 8 processing agent A-8 | 0.75 wt % - 0.25 wt % Rh alumina/zeolite The product processed with hydrogen reduction | 5.0 wt % Pd - 1.67% Rh alumina is coated. |
| Embodiment 9 processing agent A-9 | 0.75 wt % Pd - 0.25 wt % Ru alumina/zeolite The product processed with hydrogen reduction | 5.0 wt % Pd - 1.67% Ru alumina is coated. |
| Embodiment 10 processing agent A-10 | 0.75 wt % Pd silica coat/zeolite The product processed with hydrogen reduction | The inorganic porous materials of Embodiment 2 is changed from alumina to silica. |
| Embodiment 11 Processing agent A-11 | 10 wt % Pd alumina coat/zeolite The product processed with hydrogen reduction | Pd black is mixed to alumina slurry and then coated the catalyst slurry to the zeolite. |
| Embodiment 12 processing agent A-12 | 0.75 wt % Pd alumina coat/zeolite The product processed with hydrogen reduction | Alumina is coated to zeolite and then Pd-elements is impregnated by using adsorption method. |
| Embodiment 13 processing agent A-13 | 0.75 wt % Pd - 0.25 wt % Pt alumina/zeolite The product processed with hydrogen reduction | 5.0 wt % Pt alumina is coated and then 5.0 wt % Pd alumina is coated. |
| Comparative example 1 processing agent B-1 | 1.0 wt % Pd/zeolite The product not processed with hydrogen reduction | Zeolite(extrude shape of diameter 1.5 mm) is impregnated with Pd-salt solution. |

-continued

| No | Gas processing agent | Specification |
|---|---|---|
| Comparative example 2 processing agent B-2 | 1.0 wt % Pd/zeolite The product processed with hydrogen reduction | The hydrogen reduced product of Comparative example 1 |
| Comparative example 3 processing agent B-3 | 0.25 wt % Pd alumina coat/zeolite The product processed with hydrogen reduction | 2 w % Pd alumina is coated to zeolite(extruded shape of diameter 1.5 mm), and Pd content is set to be 1/3 of the Embodiment 2. |
| Comparative example 4 processing agent B-4 | 0.50 wt % Pd alumina The product not processed with hydrogen reduction | Alumina sphere(size : 3 mm in diameter) is impregnated with Pd-salt solution. |

Next, evaluation test was carried out for the gas processing agents of the Embodiments 1–13 and the Comparative examples 1–4.

The gas processing agent of 77 ml was packed into the gas purifier with an inner diameter of 17.5 mm and a length of 320 mm, keeping the temperature of the purifier at 10° C. and the pressure 880 kPa. A feed gas of the following composition were introduced from the inlet of the gas purifier and the CO, $H_2$, $CO_2$ and dew point of the gas exhausted from the outlet of the gas purifier were measured. The time when the measured values of the CO, $H_2$, $CO_2$ and dew point reached to 10 ppb, 10 ppb, 100 ppb and −80° C. respectively, was set to be a breakthrough time.

The composition of the feed gas

CO: 5 ppm $H_2$: 10 ppm

Purified air: base gas

The result of the evaluation test of the gas processing agent prepared is shown in Table 2.

TABLE 2

| No | Mean thickness of catalyst coating layer (μm) | CO Break- through time (min) | $H_2$ Break- through time (min) | $CO_2$ Break- through time (min) | Detecting time (min) of water vapor in purifi- cation gas (dew point −80° C.) |
|---|---|---|---|---|---|
| Embodiment 1 processing agent A-1 | 90 | Over 2500 | 400 | 800 | Over 2500 |
| Embodiment 2 processing agent A-2 | 90 | Over 2500 | Over 2500 | 1100 | Over 2500 |
| Embodiment 3 processing agent A-3 | 90 | Over 2500 | Over 2500 | 1200 | Over 2500 |
| Embodiment 4 processing agent A-4 | 200 | Over 2500 | Over 2500 | 1200 | Over 2500 |
| Embodiment 5 processing agent A-5 | 50 | Over 2500 | Over 2500 | 1050 | Over 2500 |
| Embodiment 6 processing agent A-6 | 90 | Over 2500 | Over 2500 | 1000 | Over 2500 |
| Embodiment 7 processing agent A-7 | 90 | Over 2500 | Over 2500 | 1050 | Over 2500 |
| Embodiment 8 processing agent A-8 | 90 | Over 2500 | Over 2500 | 1000 | Over 2500 |
| Embodiment 9 processing agent A-9 | 90 | Over 2500 | Over 2500 | 950 | Over 2500 |
| Embodiment 10 processing agent A-10 | 70 | Over 2500 | Over 2500 | 1000 | Over 2500 |
| Embodiment 11 processing agent A-11 | 80 | Over 2500 | Over 2500 | 1100 | Over 2500 |
| Embodiment 12 processing agent A-12 | 110 | Over 2500 | Over 2500 | 1000 | Over 2500 |
| Embodiment 13 processing agent A-13 | 120 | Over 2500 | Over 2500 | 1000 | Over 2500 |
| comparative example 1 processing agent B-1 | — | 200 | 200 | 350 | Over 2500 |
| comparative example 2 processing agent B-2 | — | 600 | 400 | 400 | Over 2500 |
| comparative example 3 processing agent B-3 | 100 | Over 1200 | 60 | 1000 | Over 2500 |
| comparative example 4 processing agent B-4 | — | 200 | 200 | 5 | Over 2500 |

As apparent in the above result of evaluation test, there are big difference between the Embodiments 1–13 of the present invention and the Comparative examples 1–4 in the performance.

The breakthrough times of the gas processing agents of the Embodiments 1–13 are much longer, compared with those of the Comparative examples 1,2 and 4. In the case of the comparative example 3, the breakthrough times of CO and $CO_2$ are in the almost same level with the present gas processing agent. However, the $H_2$ breakthrough time is very short.

The evaluation test result apparently shows that the following advantageous effects can be obtained by using the present gas processing agent.

(1) In the process for producing a highly purified nitrogen gas from the feed air in a semiconductor industry, as carbon monoxide and/or hydrogen contained in the feed air can be effectively oxidized at the temperature within a range of 0~80° C. in the presence of oxygen and the simultaneously-generated water vapor and/or carbon dioxide can be adsorbed and removed to the very low degree of concentration, the present process in which there is no need to heat, contrary to the conventional process in which the feed air is heated to 100~250° C. and carbon monoxide and/or hydrogen contained in the air are oxidized and removed by the catalytic reaction, is preferred economically.

(2) As dual function can be coped with by only one gas processing agent, the agent can be provided in the rearmost portion to the gas flow direction in the gas purifier. In addition, there is no need to provide a cooler and an adsorption layer for removing carbon dioxide and water vapor generated by oxidation in the rear end portion of the processing agent in the purification apparatus, compared to the conventional process, and thus the whole apparatus can be simplified with economical advantage.

(3) Even in the case that the catalyst poisoning element such as chlorine, sulfur compound, and VOC or the like is contained the feed gas, the influence of the poisoning component to the catalyst component in the gas processing agent can be minimized by providing the processing agent of the present invention in the rearmost portion of the purification apparatus and the total life time of the gas processing agent can be longer.

(4) In the regeneration process by counterflow of the purified gas in the case that the catalyst oxidizing ability or adsorption ability of the gas processing agent become lowered by the adsorption of carbon dioxide and/or water vapor, since the gas processing agent is regenerated by means of the cleanest regeneration gas by providing the gas processing agent in the rearmost end portion, the effective regeneration become more available, and thus the recovery degree of activity of the gas processing agent becomes high and the life time can be longer.

Figure 4:
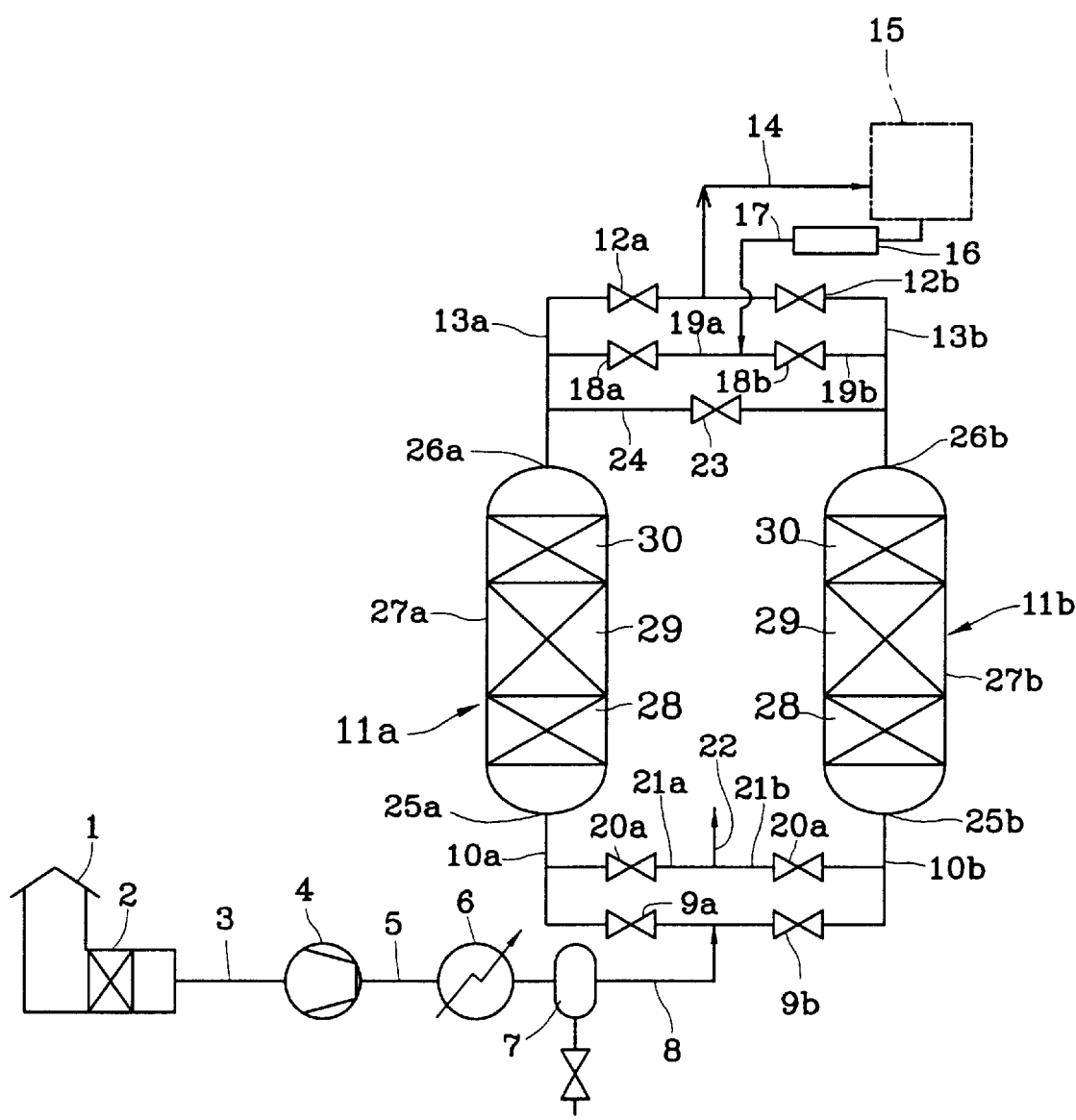
FIG. 4 shows an embodiment of a gas purifier according to the present invention applied to pre-process for a cryogenic air separation plants.

Next, an embodiment of the pre-processing apparatus of the cryogenic air separation plants using the present gas processing agent will be explained. In the flow diagram of FIG. 4, 11a and 11b are the aforementioned purifier, in which a first adsorbent layer 28 packed with the adsorbent (ex. activated alumina) adsorbing the water vapor, a second adsorbent layer 29 packed with the adsorbent (for example, zeolite) adsorbing carbon dioxide, and a gas processing agent layer 30 packed with the gas processing agent oxidizing carbon monoxide and hydrogen in the presence of oxygen, are packed into three layers in order from a gas inlet opening side in a packing vessels 27a, 27b having a gas inlet openings 25a, 25b and a gas outlet openings 26a, 26b.

A filter 2 is provided inside of an air inlet opening 1 and the air inlet opening 1 is connected to an air compressor 4 through a path 3 and the air compressor 4 is connected to a cooler 6 through a path 5. A water separator 7 is provided in an outlet side of the cooler 6 so that water in excess of saturation amount is removed from the gas which is compressed and cooled. A path 8 of an outlet side of the water separator 7 branches off into a feed air inlet opening path 10a having an inlet opening valve 9a, and a feed air inlet opening path 10b having an inlet opening valve 9b so as to be respectively connected to the gas purifiers 11a, 11b at the gas inlet openings 25a, 25b. A purified air outlet opening path 13a having an out-let opening valve 12a from the gas outlet opening 26a of the purifier 11a and a purified air outlet opening path 13b having an outlet opening valve 12b from the gas outlet opening 26b of the purifier 11b, are joined to a purified air outlet path 14 so as to supply a purified air from the path 14 into a cryogenic air separation plants 15.

Further, a regeneration gas inlet path 17 branches off into a regeneration gas inlet opening path 19a having a regeneration gas inlet opening valve 18a, and a regeneration gas inlet opening path 19b having a regeneration gas inlet opening valve 18b, so as to be respectively connected to an upper stream side of gas flow of the outlet opening valves 12a, 12b of the purified air outlet opening paths 13a, 13b. A regeneration gas outlet opening paths 21a, 21b respectively having a regeneration gas outlet opening valves 20a, 20b which are respectively connected to the feed air inlet opening paths 10a, 10b, are joined to a regeneration gas outlet path 22. Moreover, the upper stream side of the gas flow of the outlet opening valves 12a, 12b of the purified air outlet opening paths 13a, 13b is connected to a pressurization path 24 having a pressurization valve 23.

Next, an air purification method by the above-mentioned apparatus will be described. The feed air supplied from the air inlet opening 1 is introduced into the air compressor 4 through the filter 2 and the path 3 and compressed to about 5~10 kg/cm² G and then, introduced into the cooler 6 through the path 5 to be cooled to a temperature of about 5° C.~50° C. The condensed water vapor of the feed air is separated by the water separator 7 such that water vapor contained becomes to have saturated vapor pressure. Then, the feed air is introduced into the one of the purifiers, for example, the gas purifier 11a carrying out adsorption step, from the path 8 through the feed air inlet path 10a having the inlet opening valve 9a which is opened.

The most of the water vapor contained in the compressed air introduced into the gas purifier 11a is adsorbed and removed at first in the first adsorbent layer 28 which is the packed nearest part of the inlet opening. Subsequently, the most of the carbon dioxide contained is adsorbed and removed in the second adsorbent layer 29 which is formed in the upper side of the first adsorbent layer. Then, the carbon monoxide and/or hydrogen contained in the feed air are oxidized in the gas processing agent layer 30 which is formed nearest the gas outlet opening, by oxygen in the compressed air so as to be converted to the carbon dioxide and water vapor. The converted carbon dioxide and the water vapor are immediately adsorbed to the adsorbent of the gas processing agent layer 30 such that the feed air becomes the purified air. The purified air is supplied to the cryogenic air separation plants 15 from the gas outlet opening 26a through the purified air outlet opening path 13a having the outlet opening valve 12a which is opened and through the purified air outlet path 14.

Further, while the compressed air is purified in the purifier 11a, a regeneration is carried out in the purifier 11b of the other side for removing the impurities adsorbed in the gas processing agent layer 30, the first adsorbent layer 28 and the second adsorbent layer 29. That is to say, after the regeneration gas outlet opening valve 20b is opened in order to decrease the pressure inside of the purifier 11b to the atmospheric pressure through the regeneration gas outlet opening path 21b and the regeneration outlet path 22, the regeneration gas inlet opening valve 18b is opened and the regeneration gas, for example, a portion of the purified air is heated to the temperature of about 150° C. in a heater 16 by way of the regeneration gas inlet path 17, and then introduced into the inside of the purifier 11b from the gas outlet opening 26b though the regeneration gas inlet opening path 19b and the regeneration gas inlet opening valve 18b, to thereby regenerate the gas processing agent and the adsorbent of the purifier 11b. Then, the regeneration air is exhausted to the atmosphere through the feed air inlet opening path 10b, the regeneration gas outlet opening valve 20b, the regeneration gas outlet opening path 21b and the regeneration gas outlet path 22.

After the gas purifier 11b is heated for a predetermined time, the gas purifier 11b enteres into a cooling step by turning off the heater. If the inside of the gas purifier 11b is cooled to the predetermined temperature, the regeneration process is completed. If the regeneration process is completed, the regeneration gas inlet opening valve 18b and the regeneration outlet opening valve 20b is closed and the pressurization valve 23 is opened. Then, a portion of the purified air from the gas purifier 11a is introduced into the gas purifier 11b from the gas outlet opening 26b through the purified air outlet opening path 13a, the pressurization path 24 and the purified air outlet opening path 13b so as to increase the pressure of the gas purifier 11b. After the pressurization is completed, the pressurization valve 23 is closed and the inlet opening valve 9b is opened for introducing the compressed air into the gas purifier 11b such that the purifier 11b is repressurized to a working pressure. Then, the inlet opening valve 9a and the outlet opening valve 12a are closed and simultaneously, the inlet opening valve 9b and the outlet opening valve 12b are opened. The compressed air is introduced into the gas purifier 11b to commence purification by the purifier 11b. The process in the gas purifier 11b which is the same process in the gas purifier 11a, is carried out so as to purify the compressed air. Then, the purified air from the gas purifier 11b is supplied into the cryogenic air separation plants, similarly to the case of the gas purifier 11a. Meanwhile, the regeneration process as the above-mentioned is performed with respect to gas purifier 11a.

Further, for the adsorption-desorption system with the purifiers 11a, 11b, TSA(Thermal Swing Adsorption) method was described but PSA(Pressure Swing Adsorption) method may be also carried out. Moreover, the two layers packing type shown in the FIG. 3 may be used as the gas purifier.

Further, the above-mentioned embodiment is the example of the case where the present invention is applied to the purification of the feed air in the cryogenic air separation plants. However, the present invention is not limited to the air and may be applied to the purification of a gas containing the same impurities.

The gas processing agent of the present invention has the structure that the catalyst layer is formed on the adsorbent, and thus the $CO_2$ and/or $H_2O$ oxidized and generated in the catalyst layer are adsorbed from the catalyst layer immediately to the adsorbent without staying catalyst layer. For this reason, the catalyst layer can keep a high oxidation activity over CO and/or $H_2$.

Therefore, the gas processing agent of the present invention can remove CO, $H_2$, $CO_2$ and $H_2O$ at the same time, and has a long life time both to the oxidation of CO and $H_2$ and to the adsorption of $CO_2$ and $H_2O$.

The gas purification method of the present invention using the above-mentioned gas processing agent is superior to the conventional gas purification method from the following point of view. That is to say, according to the gas purification method of the present invention, it is possible that carbon monoxide and/or hydrogen contained in a gas are oxidized to a low concentration in the temperature range of 0° C.~80° C. in the presence of oxygen effectively and the simultaneously-generated water vapor and/or carbon dioxide are adsorbed and removed to a low concentration effectively for a long time. Therefore, it is possible to manufacture a gas with a high degree of purity economically from a gas mixture containing those components as impurities.

What is claimed is:

1. A gas processing agent obtained by forming a catalyst layer which has a thickness of 10–500 μm and is made of an inorganic porous material containing at least one element selected from the group consisting of platinum, palladium, rhodium, ruthenium and oxides thereof, on a surface of an adsorbent, and the inorganic porous material containing at least one component selected from the group consisting of alumina, titania, silica, silica-alumina, zirconia and tinoxide, and the adsorbent is at least one selected from the group consisting of Li-X, Na-X, Ca-X, Ba-X, Na-A and Ca-A type zeolite.

2. The gas processing agent according to claim 1, wherein content of the at least one element selected from the group consisting of platinum, palladium, rhodium, ruthenium and the oxides thereof, is within a range of 0.25 wt % though 10 wt % with respect to the total weight of the gas processing agent.

3. A manufacturing method of the gas processing agent according to claim 1 comprising the steps of:
 (a) preparing a slurry of a precursor of the catalyst or a slurry of the catalyst,
 (b) coating the slurry onto the adsorbent and then calcining that.

4. The manufacturing method of the gas processing agent according to claim 3, wherein a gas phase reduction step is carried out after calcination of the slurry coated adsorbent.

5. A manufacturing method of the gas processing agent according to claim 1 comprising the steps of:
 (a) preparing a slurry of the inorganic porous materials,
 (b) coating the slurry(a) onto the adsorbent and then calcining that,
 (c) preparing a slurry of at least one compound selected from a group consisting of platinum, palladium rhodium and ruthenium,
 (d) coating the slurry(c) onto the adsorbent and then calcining that.

6. A gas purification method for purifying a teed gas containing at least carbon monoxide and/or hydrogen as an amount of impurities so as to remove the amount of the impurities, using the gas processing agent according to claim 1, wherein a temperature of the gas processing agent is set within the range of 0° C. through 80° C.

7. The gas purification method according to claim 6, further comprising the steps of:
 preparing a preliminary adsorbent layer having an adsorbent packing layer; and
 adsorbing and removing a catalyst-poisoning component contained in the feed gas by the adsorbent packing layer.

8. The gas purification method according to claim 6, further comprising the steps of:
 preparing at least 2 units of a gas purifier;
 switching the at least 2 units of the gas purifier between a purifying step and a regenerating step alternatively;
 operating the at least 2 units of said purifier continuously; and supplying a regeneration gas to said purifier in the regenerating step in a counterflow direction.

9. A gas purification method for purifying a feed gas containing an amount of water vapor and carbon dioxide as impurities and at least carbon monoxide and/or hydrogen as an amount of impurities so as to remove the amount of water vapor and carbon dioxide as impurities and the amount of the impurities of carbon monoxide and/or hydrogen, the method comprising the steps of:

adsorbing and removing the contained water vapor by a water vapor adsorbent;

adsorbing and removing the contained carbon dioxide by a carbon dioxide adsorbent; and removing the carbon monoxide and/or hydrogen contained by the gas processing agent according to claim 1.

10. A gas purification method for purifying a feed gas containing an amount of water vapor and/or carbon dioxide as impurities and at least carbon monoxide and/or hydrogen as an amount of impurities so as to remove the amount of water vapor and/or carbon dioxide as impurities and the amount of the impurities of carbon monoxide and/or hydrogen, the method comprising the steps of:

adsorbing and removing the contained water vapor and/or carbon dioxide by a water vapor adsorbent or by a water vapor and carbon dioxide adsorbent; and removing the amount of carbon monoxide and/or hydrogen contained by the gas processing agent according to claim 1.

11. A gas purifier packed with an adsorbent and a gas purifying processing agent in a packing vessel having a feed gas inlet opening and a feed gas outlet opening, in order from a feed gas inlet opening side so as to form a water vapor adsorbent packing layer, a carbon dioxide adsorbent packing layer, and a gas processing agent packing layer according to claim 1.

12. The gas purifier according to claim 11, wherein the adsorbent packing layer has an ability of adsorbing catalyst-poisoning component contained in the feed gas.

13. A gas purification apparatus using the gas purifier according to claim 11, comprising;

at least 2 units of the gas purifier;

a switching means for switching the gas purifier between purifying step and regenerating step by turns; and a regeneration gas supply means for supplying a regeneration gas to the purifier in the regenerating step in the direction of counterflow.

14. A gas purifier packed with an adsorbent and a gas purifying processing agent in a packing vessel having a feed gas inlet opening and a feed gas outlet opening, in order from a feed gas inlet opening side so as to form a water vapor and carbon dioxide adsorbent packing layer or a water vapor adsorbent packing layer, and a gas processing agent packing layer according to claim 1.

15. The gas processing agent according to claim 1, wherein the thickness of said catalyst layer is in a range of 30 to 200 $\mu$m.

16. The gas processing agent according to claim 1, wherein the specific surface area of said inorganic porous material is 30 $m^2/g$ or more.

* * * * *